US007512097B2

(12) United States Patent
Jelitto et al.

(10) Patent No.: US 7,512,097 B2
(45) Date of Patent: Mar. 31, 2009

(54) ADAPTING TRANSMISSION PARAMETERS IN A TRANSMITTING NODE OF A DATA COMMUNICATION SYSTEM TO THE CURRENT LINK QUALITY OF A DATA COMMUNICATION CHANNEL

(75) Inventors: Jens Jelitto, Rueschlikon (CH); Hong Linh Truong, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 11/000,842

(22) Filed: Dec. 1, 2004

(65) Prior Publication Data

US 2005/0128998 A1 Jun. 16, 2005

(30) Foreign Application Priority Data

Dec. 5, 2003 (EP) .................................. 03405868

(51) Int. Cl.
*H04Q 7/00* (2006.01)
(52) U.S. Cl. ...................................... 370/329
(58) Field of Classification Search ........................ None
See application file for complete search history.

(56) References Cited

U.S. PATENT DOCUMENTS 6,728,259 B1 * 4/2004 Gronberg .................... 370/465

7,336,634 B2 * 2/2008 del Prado et al. ............ 370/332
2003/0083088 A1 5/2003 Chang et al.
2005/0286410 A1 * 12/2005 Truong et al. ............... 370/216

OTHER PUBLICATIONS

Barreto et al, Power and Rate Adaptation in IEEE802.11a Wireless LANs, IEEE, pp. 413-417, May 2003.*

* cited by examiner

*Primary Examiner*—Frank Duong
(74) *Attorney, Agent, or Firm*—Scully, Scott, Murphy & Presser, P.C.; Lisa M. Yamonaco

(57) ABSTRACT

Provides apparatus, systems and methods for adapting a first and second transmission parameter R, P in a transmitting node of a data communication system to the current link quality of a data communication channel. A method comprises in the transmitting node counting the number of successful transmissions s, each successful transmission bases on a receipt of an acknowledgment "ACK", and comparing the number of successful transmissions s against a threshold value $S_{max}$. In the event of reaching the threshold value $S_{max}$ and operating with the first and second transmission parameter R, P in a predetermined parameter space, the method further comprises adapting at least one of the first and second transmission parameters R, P in dependence on a critical value that due to the current link quality corresponds to a temporarily unsupported value of one of the first and second transmission parameters R, P.

17 Claims, 6 Drawing Sheets

ADAPTING TRANSMISSION PARAMETERS IN A TRANSMITTING NODE OF A DATA COMMUNICATION SYSTEM TO THE CURRENT LINK QUALITY OF A DATA COMMUNICATION CHANNEL

TECHNICAL FIELD

The present invention is related to adapting transmission parameters to the current quality of a transmission channel. More particularly, the invention allows adaptation of a variable data rate and a power level to the channel conditions in a wireless local area network.

BACKGROUND OF THE INVENTION

Wireless local area networks (WLANs) have been designed for data communication and have found widespread acceptance and proliferation in the industry. Two wireless broadband LANs (WLANs) are standardized in the 5 GHz band, namely IEEE 802.11a and ETSI HIPERLAN/2. The physical layers of both standards are very similar: they both use a modulation technique called "Orthogonal Frequency Division Multiplexing (OFDM)" and can provide up to 8 different transmission modes with data rates ranging from 6 Mbps up to 54 Mbps. This multi-rate capability enables a WLAN station to select a transmission mode which is best appropriate to the current radio channel quality to reach the best performance.

The capability of WLANs to support multiple rates enables the stations to select the appropriate transmission rate depending on the required quality of service and on the radio channel conditions. If, for example, a station wants to communicate with another station over a large distance, then the resulting signal-to-noise ratio (SNR) value at the receiver might be too low for using a high rate. In such a situation a more robust but lower rate is required in order to communicate at all. On the other hand, if the quality of the channel is sufficiently good, then it is desirable to transmit at higher rates. Nevertheless, if the rate chosen is too high, additional re-transmissions are required, resulting in throughput degradation or even a total loss of communication. Choosing too conservatively a data rate also results in throughput degradation by not using the radio resources efficiently.

Therefore, in order to achieve the highest possible system performance a dynamic rate adaptation is desired. Such a mode would support services that require high data rates, and helps maximize the throughput or minimize the transmission delay for real-time applications.

An intelligent selection procedure for the transmit power, on the other hand, has a strong impact on the overall energy consumption, which is of particular importance in portable devices with limited battery energy. Even though in current laptops using WLAN PC cards the transmit power may be negligible compared with the overall consumed power, this picture is likely to change as the trend towards smaller devices such as personal digital assistants (PDAs) with integrated WLAN modems continues. Here, transmission power awareness will be crucial to increase battery life. Furthermore, reducing the transmit power, in particular when the transmitter and receiver are located close to each other, helps to reduce the interference in neighboring cells using the same frequency channel.

In general, adaptive adjustment of the transmission rate is achieved by having a receiver estimating the channel link quality, deriving from this estimation the rate to be used in future transmissions, and sending this information back to the transmitter. The main issues for an efficient link adaptation mechanism are the determination of the parameters to be used for the link quality estimation, e.g. packet error rate, signal to noise ratio, received signal strength, carrier to interference ratio, etc., how to measure them, and how to select the appropriate rate out of the measurement results.

In HIPERLAN/2, it is the responsibility of an Access Point (AP) to dynamically select any of the available physical layer (PHY) modes for the down- and uplink transmissions. A Mobile Terminal (MT) continuously measures the quality of the downlink and suggests a suitable downlink transmission rate to the AP. For the uplink the AP itself performs the link quality estimation. The standard however does not specify how the link quality estimation and the corresponding transmission mode selection are performed. S. Simoens and D. Bartolomé describe in their article "Optimum performance of link adaptation in HIPERLAN/2 Networks", VTC 2001, a method for estimating the Signal to Noise plus Interference Ratio (SNIR) and based on this estimation determining the transmission rate that would maximize the throughput of an HIPERLAN/2 network. Similarly, Z. Lin, G. Malmgren, and J. Torsner studied in their article "System Performance Analysis of Link Adaptation in HiperLAN Type 2", VTC Fall 2000, the performance of the link adaptation of HIPER-LAN/2 when using a Carrier to Interference ratio (C/I) as link quality parameter.

The standard IEEE 802.11 only specifies which transmission rates are allowed for which types of medium-access-control layer (MAC) frames, but not how and when to switch between the permitted rates. Furthermore, there is no signaling mechanism specified which would allow a receiver to inform the transmitter about the quality of the communication channel or the rate to be used. The transmitter can change the rate at any time between two consecutive packets, but not in the middle of a sequence of MAC frames belonging to the same packet. The rate at which a MAC frame is transmitted is coded in the header of the physical layer (the so-called PLCP header) which is sent at a fixed rate (6 Mbps in case of IEEE 802.11a) supported by all stations. Thus, after having decoded successfully the PLCP header, the receiver switches to the indicated rate to receive the MAC frame.

Although IEEE 802.11 WLANs are becoming more and more popular, little has been published about the rate adaptation techniques that could be applied to those networks. A. Kamerman and L. Montean describe in "WaveLAN-II: A High-Performance Wireless LAN for the Unlicensed Band", Bell Labs Technical Journal, Summer 1997, pp. 118-133, a method used in Lucent's WaveLAN-II devices. It is basically an automatic method for switching between two transmission rates, with the high one as the default operating rate. The device switches automatically to the low rate after two consecutive transmission errors and back to the high rate either after ten successful transmissions or after a time out occurs.

As mentioned above, the IEEE 802.11 standard does not specify how rate switching should be executed in case of multi-rate PHY layers. It only specifies which rates have to be used for sending which MAC frames. It even does not provide any protocol means for a receiver to inform the transmitter about the actual link quality or the transmission rate to be used. That is why the link adaptation method described by G. Holland et. al. in "A Rate-Adaptive MAC Protocol for Multi-Hop Wireless Networks", ACM/IEEE International Conference on Mobile Computing and Networking (MOBI-COM'01) Rome, Italy, July 2001, cannot be applied to current IEEE 802.11 WLANs, since it is based on the principle that the receiver determines the link quality and requests the transmitter to switch to a more appropriate rate.

This patent application is related to the International application with No. PCT/IB03/02784, entitled "Link adaptation" filed on 17 Jun. 2003, presently assigned to the assignee of the instant application. The International application relates to a link adaptation in which one parameter, e.g. rate, is adjustable.

U.S. 2003/0083088 A1 describes a wireless network which includes transmission power and data rate adaptation based upon signal quality experienced by the user. However, the signal quality for a mobile station has to be measured which is rather costly. Further, while the transmission rate is fixed the transmission power level is adjusted. The transmission rate is then only adjusted if necessary based upon the signal quality measured over a period of time by using a feedback channel. This adaptation scheme is thus not applicable to IEEE 802.11 WLANs.

There is however no known practical mechanism for dynamically adapting both the transmit rate and the transmit power at the same time. Either is the transmit power fixed at a certain value and the transmit rate changed according to the quality of the link, or the transmit rate is kept at a certain value while trying to increase or decrease the transmit power.

From the above it follows that there is still a need in the art for an improved and efficient link adaptation mechanism. The mechanism should allow to reduce the transmit power to the lowest possible level while transmitting at the highest possible rate. Moreover, only information available at the transmitter side should be sufficient to guess whether the actual link quality is improving or worsening.

SUMMARY AND ADVANTAGES OF THE INVENTION

Therefore, methods, systems and apparatus are provided which take advantage of a link adaptation mechanism that allows adaptation of both transmission parameters, i.e. data rate and power level, dynamically to the actual link quality, thus allowing e.g. to reduce the transmit power to the lowest level while transmitting at a highest rate. The mechanism can be implemented in two modes, depending on whether high transmission rates or low sending power levels are desired.

In accordance with the present invention, there is provided a method for adapting a first and second transmission parameter R, P in a transmitting node of a data communication system to the current link quality of a data communication channel. The method comprises in the transmitting node the steps of counting the number of successful transmissions s, each successful transmission bases on a receipt of an acknowledgment "ACK", and comparing the number of successful transmissions s against a threshold value $S_{max}$. In the event of reaching the threshold value $S_{max}$ and operating with the first and second transmission parameter R, P in a predetermined parameter space, the method further comprises the step of adapting at least one of the first and second transmission parameters R, P in dependence on a critical value that due to the current link quality corresponds to a temporarily unsupported value of one of the first and second transmission parameters R, P. The method can be used for adaptation of a variable data rate and transmit power level to the link quality, thereby supporting multiple transmission rates and various power levels.

The method can comprise the step of selecting the adapted first and second transmission parameter R, P from a set of transmission parameters, which allows a fast use of pre-defined values.

The method can further comprise counting a number of faulty transmissions f and selecting the adapted transmission parameters at a threshold of the number of faulty transmissions $F_{max}$. This has the advantage that also faulty transmissions are considered and a suitable reaction, e.g. reducing the transmit data rate or increasing the transmit power level, can be applied accordingly. In other words, it can, for example, mean switching to a lower data rate or a higher power level immediately after one faulty transmission.

In accordance with a further aspect of the present invention, there is provided an apparatus for adapting a first and second transmission parameter R, P in a transmitting node of a data communication system to the current link quality of a data communication channel. The apparatus comprises a success counter for counting the number of successful transmissions, whereby each successful transmission bases on a receipt of an acknowledgment "ACK". The apparatus further comprises a comparison unit for comparing the number of successful transmissions against a threshold value, a critical mode register for storing a critical value that due to the current link quality corresponds to a temporarily unsupported value of one of the first and second transmission parameters R, P, and a decision unit for adapting at least one of the first and second transmission parameters R, P in dependence on the critical value stored in the critical mode register. The apparatus can also comprise a delay value counter for counting a delay value. The stored delay value helps to optimize and support the parameter space.

DESCRIPTION OF THE DRAWINGS

Embodiments of the invention are described in detail below, by way of example only, with reference to the following schematic drawings.

Figure 1:
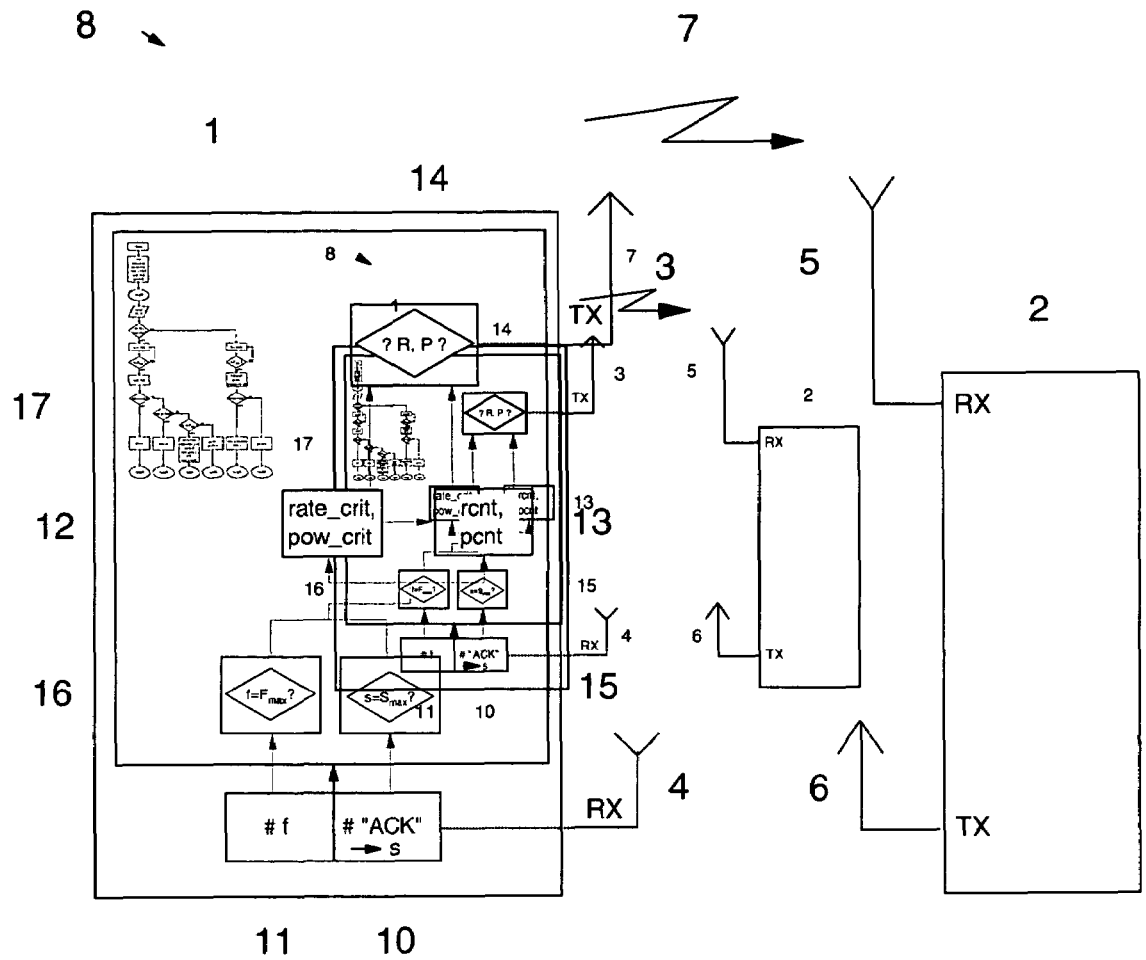
FIG. 1 shows a schematic illustration of a communication environment with a transmitting station and a receiving station.

The drawings are provided for illustrative purpose only and do not necessarily represent practical examples of the present invention to scale.

DETAILED DESCRIPTION OF EMBODIMENTS

The present invention provides methods, systems and apparatus which take advantage of a link adaptation mechanism that allows adaptation of both transmission parameters, i.e. data rate and power level, dynamically to the actual link quality, thus allowing e.g. to reduce the transmit power to a lowest level while transmitting at a highest rate. The mechanism can be implemented in two modes, depending on whether high transmission rates or low sending power levels are desired.

In general, the link adaptation mechanism is based on the immediate "ACK" strategy defined in the IEEE 802.11 MAC layer, in which an error-free frame is immediately acknowledged by the receiver. If the transmitter does not receive an ACK (acknowledgment) for a data frame sent to a certain receiver, it concludes that the quality of the link to that receiver has deteriorated and that therefore a lower transmission rate or a higher transmit power should be used for future transmissions to that receiver. On the other hand, if the transmitter succeeds in sending multiple data frames to a certain receiver, it assumes that the quality of the link has improved and therefore a higher rate or a lower transmit power should be used for future transmissions.

In accordance with the present invention, there is provided a method for adapting a first and second transmission parameter R, P in a transmitting node of a data communication system to the current link quality of a data communication channel. The method comprises in the transmitting node the steps of counting the number of successful transmissions s, each successful transmission bases on a receipt of an acknowledgment "ACK", and comparing the number of successful transmissions s against a threshold value $S_{max}$. In the event of reaching the threshold value $S_{max}$ and operating with the first and second transmission parameter R, P in a predetermined parameter space, the method further comprises the step of adapting at least one of the first and second transmission parameters R, P in dependence on a critical value that due to the current link quality corresponds to a temporarily unsupported value of one of the first and second transmission parameters R, P. The method can be used for adaptation of a variable data rate and transmit power level to the link quality, thereby supporting multiple transmission rates and various power levels.

The step of adapting can further comprise adapting the at least one of the first and second transmission parameters R, P in dependence on a delay value. By using the delay value the probability of a premature adaptation which could lead to a faulty transmission can be minimized. Thus, the throughput can be improved.

In the event of equating the delay value to a maximum success transmission value $R_{max}$, $P_{max}$, the critical value can be adjusted, i.e. relaxed. The adjustment optimizes the parameter space when the channel conditions allows this. The performance can thus be maximized. Further, in the event of equating the delay value to a maximum success transmission value $P_{max}$, $R_{max}$, the critical value can be set to nil, i.e. the critical value is not set at all and there is no restriction or limit. By using this optimistic approach the entire parameter space can be supported for highly variable channel conditions. The method can comprise the step of selecting the adapted first and second transmission parameter R, P from a set of transmission parameters, which allows a fast use of predefined values.

The method can further comprise counting a number of faulty transmissions f and selecting the adapted transmission parameters at a threshold of the number of faulty transmissions $F_{max}$. This has the advantage that also faulty transmissions are considered and a suitable reaction, e.g. reducing the transmit data rate or increasing the transmit power level, can be applied accordingly. In other words, it can, for example, mean switching to a lower data rate or a higher power level immediately after one faulty transmission.

The method can further comprise selecting the transmission parameters used by a responding node, also referred to as responding receiver or station. For example, the data rate used by that station is taken into account. This allows to use this rate immediately for further communication and can be done as follows. When the transmitting node or station, also referred to as transmitter, receives a frame correctly from a peer station, i.e. the receiver, it checks whether that frame was sent with a rate different to the one it uses currently for transmitting frames to that station. If this is the case, the transmitter may update its transmission rate with the one used by the peer. In an preferred embodiment, the transmitter only updates if the transmission rate used by the peer is higher. Similarly, the latter can be applied to the power level adequately.

The method provides basically a dynamic link adaptation mechanism that can be implemented in a compatible way with the current IEEE 802.11 MAC specification. Using the mechanism, an IEEE 802.11 compliant transmitter is able to detect whether the quality of a link to a certain destination is improving or declining, and based on this information to select and switch to the adapted transmission parameters, respectively.

It is advantageous that the mechanism employs only information available at the transmitter side to determine whether the actual link quality is improving or worsening and therefore first does not require the availability of a feedback channel and second remains conform to the standards. This can be achieved by making use of the so-called error recovery procedure defined in the MAC (medium access control) layer of the IEEE 802.11 standard.

In the present invention, there is also provided an apparatus for adapting a first and second transmission parameter R, P in a transmitting node of a data communication system to the current link quality of a data communication channel. The apparatus comprises a success counter for counting the number of successful transmissions, whereby each successful transmission bases on a receipt of an acknowledgment "ACK". The apparatus further comprises a comparison unit for comparing the number of successful transmissions against a threshold value, a critical mode register for storing a critical value that due to the current link quality corresponds to a temporarily unsupported value of one of the first and second transmission parameters R, P, and a decision unit for adapting at least one of the first and second transmission parameters R, P in dependence on the critical value stored in the critical mode register.

The apparatus can be operated in one of a throughput performance mode and a power saving mode. This allows the design of various devices for specific purposes, e.g. mobile or hand held devices for the use of the power saving mode. On the other hand, devices having sufficient power or battery capacity should rather use the throughput performance mode. In a preferred embodiment the apparatus comprises a switch to operate in either the throughput performance mode or the power saving mode. This allows to use the same modules for both modes and helps to save space, i.e. simplifying the design of devices. In view of the duality of the disclosed mechanism, each of the first and second transmission parameters R, P can be associated with a data rate and a power level in dependence of the mode. This again simplifies the design of user devices.

Furthermore, the apparatus can comprise a failure counter for counting a number of faulty transmissions, which allows to react on failures in transmission. The apparatus can also comprise a delay value counter for counting a delay value. The stored delay value helps to optimize and support the parameter space.

Although the present invention is applicable in a broad variety of transmission applications it will be described with the focus put on an application to wireless systems, i.e. Wireless Local Area Networks (WLAN), using orthogonal frequency division multiplexing (OFDM) as employed in the WLAN standards IEEE 802.11a and HIPERLAN/2. Before embodiments of the present invention are described, some basics, in accordance with the present invention, are addressed. As the invention takes advantage of the so-called error recovery procedure defined in the MAC (medium access control) layer of the IEEE 802.11 standard, this error recovery procedure is described in more detail below.

The IEEE 802.11 basic access procedure is a distributed procedure based on the known Carrier Sense Multiple Access (CSMA) method used in Ethernet LANs (local area networks). A station with a pending data packet has to sense the state of the wireless medium before it can transmit. If the medium is free longer than a predefined time interval, it can proceed with the transmission. Otherwise it first waits until the medium becomes free, then generates a random backoff time before it tries to transmit to minimize the probability of collision with other stations. MAC (medium access control) frames are protected against errors (due to transmission errors or collisions) by means of a frame check sequence (FCS) field containing a 32-bit cyclic redundancy checksum (CRC) and of a simple send-and-wait automatic repeat request (ARQ) mechanism. If the receiver of a MAC frame detects a CRC error, the frame is discarded. Otherwise, if a MAC (medium access control) frame does not contain a CRC error, the receiver waits for a short, predefined SIFS (Short Inter-Frame Space) time and sends an ACK (acknowledge) frame back to the transmitter. If the transmitter does not receive an ACK frame within a specified time, it assumes that the transmitted frame is disturbed and will resend the frame after a random backoff time. The procedure is repeated until the transmitter receives an ACK frame from the receiver, or a maximum life time or a maximum number of retries is reached.

Generally, the performance and efficiency of the presented link adaptation mechanism depends on the thresholds for the number of successful transmissions s and faulty transmissions f. A successful transmission is considered as a reception of an ACK frame. In the event that no ACK frame is received in due time a faulty transmission is assumed. In particular, a success threshold value $S_{max}$ and failure threshold value $F_{max}$, are considered below. With the failure threshold value $F_{max}$ of the number of faulty transmissions f one can control how long a transmitter should stay, e.g., at a certain rate before it can assume that the link quality is degraded so that it should switch to a lower rate. A high value of the failure threshold value $F_{max}$ may impact the performance negatively, in particular when the link quality is degrading rapidly.

The success threshold value $S_{max}$ defines the maximum number of successful transmissions s which the transmitter should achieve before it can assume that the link quality has improved so that it should switch, e.g., to the next higher data rate.

Simulation results reveal that the efficiency of the link adaptation mechanism is sensitive to the success threshold value $S_{max}$ and the failure threshold value $F_{max}$, which might be selected adaptively.

With reference to FIG. 1, a general layout of a communication system 8 is described in which the adaptation of a first and second transmission parameter R, P in a transmitting node 1 is performed according to the current link quality of a data communication channel 7. As indicated in FIG. 1, a signal can be transmitted via the channel 7. Usually, the signal comprises a frame or several frames. The presented embodiment relates to the IEEE 802.11a standard supporting an Orthogonal Frequency Division Multiplexing (OFDM) transmission scheme in the 5 GHz band with variable data rates, i.e. 6 Mbit/s to 54 Mbit/s. FIG. 1 shows the transmitting node 1, hereafter referred to as transmitter 1, and a receiving or responding node 2, hereafter referred to as receiver 2. The transmitter 1 is located at a first location while the receiver 2 is located at a second location. Multiple instances of the receivers 2 can be provided (not shown) within a WLAN. The transmitter 1 comprises a first transmit antenna 3 over which a signal, hereafter called sent signal, is transmitted and a first reception antenna 4 with which an "ACK" (acknowledgment) signal, but also further data, is receivable. Both antennas 3, 4 also can form a unit. The receiver 2 comprises a second reception antenna 5 with which the mentioned sent signal or data is received. A second transmit antenna 6 is used to send the "ACK" (acknowledgment) signal or data out if valid data has been received.

The transmitter 1 comprises here a success counter 10 and a failure counter 11 which are connected to a control logic unit 17. The control logic unit 17 comprises a success comparison unit 15 and a failure comparison unit 16 which receive input from the success counter 10 and the failure counter 11, respectively. Moreover, the control logic unit 17 comprises a critical mode register 12 and a delay value counter 13. Both 12, 13 receive input from the comparison units 15, 16. A decision unit 14 is further part of the control logic unit 17 which receives input from the critical mode register 12 and the delay value counter 13. As indicated in the figure, the success counter 10 can be combined with the failure counter 11. The success counter 10 counts the number of successful transmissions s whenever one "ACK" (acknowledgment) signal is received via the first reception antenna 4, because then the sent signal was received by the receiver 2 and acknowledged. Similarly, the failure counter 111 counts the number of unsuccessful transmissions f whenever no "ACK" (acknowledgment) signal is received via the first reception antenna 4, because then the sent signal was not received by the receiver 2 and thus not acknowledged. The comparison unit 15 compares the number of successful transmissions s against the success threshold value $S_{max}$. The critical mode register 12 stores a critical value, indicated with rate_crit for a critical data rate and pow_crit for a critical power level, that due to the current link quality corresponds to a temporarily unsupported value of one of the first and second transmission parameters R, P. The decision unit 14 adapts at least one of the first and second transmission parameters R, P in dependence on the critical value rate_crit, pow_crit stored in the critical mode register 12. This means there is a switching to the adapted transmission parameters, as described in more detail below. In the embodiment, the adapted transmission parameters are transmit data rate, also indicated by R, and transmit power level, also indicated by P, but also other parameters could be adapted, e.g. packet length, and even a combination thereof. A set of or multiple different transmission parameters can be provided and used. The decision unit 14 finally selects the suitable transmission parameters which should be used for the future transmission or the further processing. The method of working in the transmitter 1 and in particular within the control logic unit 17 is described in more detail with reference to FIGS. 2 and 3, where FIG. 2 relates to a throughput performance mode and FIG. 3 to a power saving mode. Both modes can be combined by using the same modules as indicated in FIG. 1.

In the following, the two modes for adapting both transmit rate and transmit power are addressed briefly before they are described in more detail with reference to the FIGS. 2 and 3.

The "throughput performance" mode: In this mode the primary optimization aims at the highest possible transmit rate, and the transmit power is of secondary importance. This mode applies for example when the wireless station, i.e. the transmitter 1, is line powered and therefore no high demand for power saving is required or if the highest possible rate is required by an application.

The "power saving" mode: In opposite to the former mode, here the primary optimization aims at the lowest possible transmit power level. This mode can for example be used in portable devices to save battery power.

The same reference numbers are used within the description to denote the same parts or the like.

Figure 2:
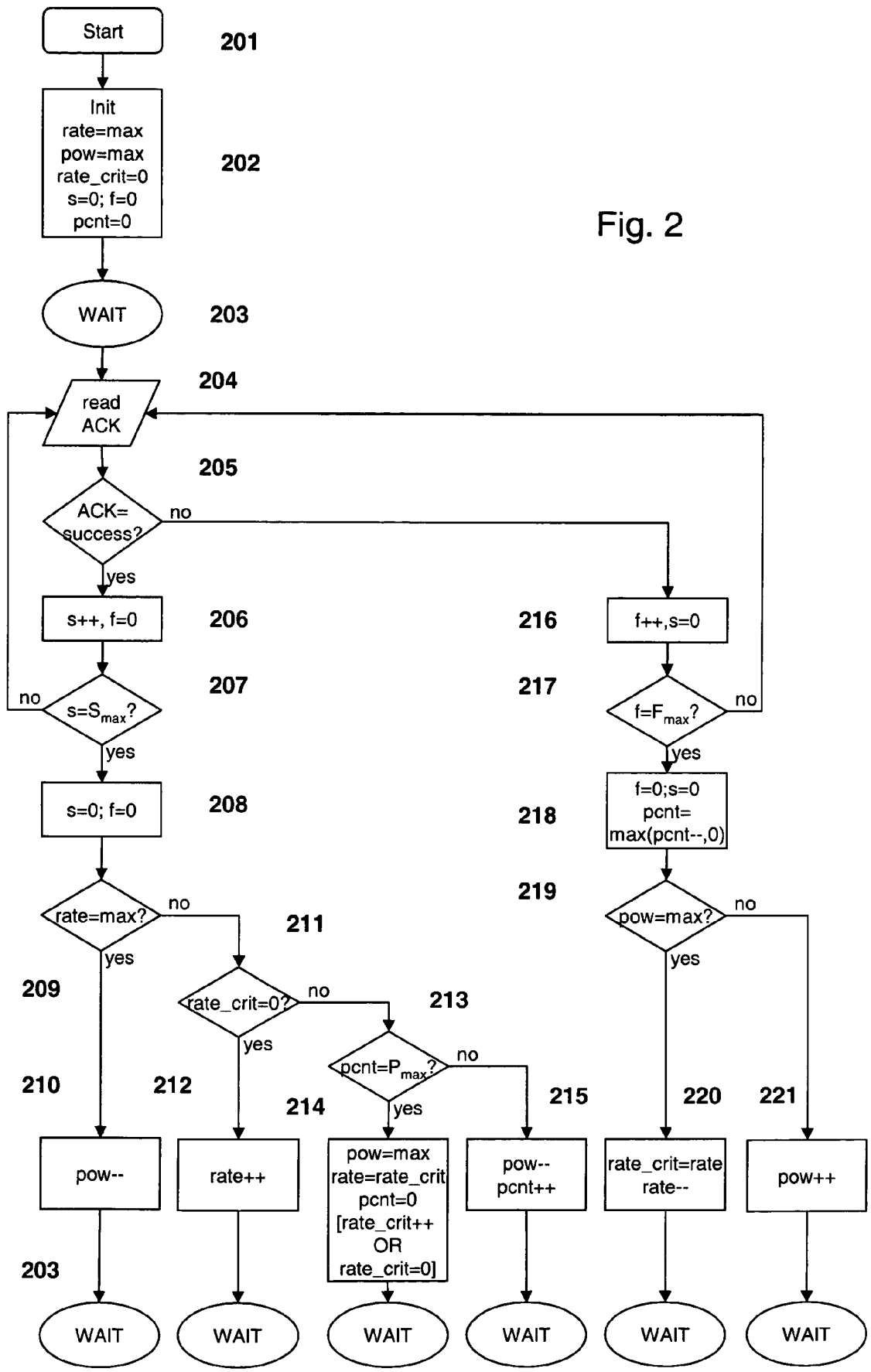
FIG. 2 shows a schematic illustration of a flow diagram according to a first embodiment as it is applicable by the transmitting station for a throughput performance mode.

FIG. 2 shows a self-explaining schematic illustration of a flow diagram according to a first embodiment as it is applicable by the transmitting station 1 in the control logic unit 17 for a throughput performance mode. The presented mechanism allows to estimate qualitatively the changing link quality and to adapt dynamically the transmission parameters R, P. As mentioned above, in this mode it is tried to support the highest possible data rate. Therefore, after $S_{max}$ successful transmissions (i.e. it can be assumed that the link quality has improved) the transmit data rate is increased until the maximum rate is reached. If the transmit data rate cannot be increased further, the transmit power level is then reduced.

In case of $F_{max}$ failed transmissions, it is tried first to increase the power level and keep the rate at its current value. The rate is only reduced if the transmit power has already reached its maximum level. The critical value rate_crit takes into account the case where a data rate cannot be used due to the channel conditions even with the maximum power level. A currently unsupported rate value is stored as the critical value rate_crit in the critical mode register 12. If this variable is set, then one knows that under the current channel conditions it makes no sense to increase the rate to the critical value rate_crit. Instead, it is more suitable to reduce the transmit power after $S_{max}$ successful transmissions, assuming that the current rate still works with a reduced power level. If the data rate below the critical value rate_crit can still be supported after decreasing the power level $P_{max}$ times, it is assumed that the channel conditions have improved again. Hence, it is tried to increase the data rate to the critical value rate_crit using the highest possible transmit power level. In order to further increase the maximum data rate, the critical value rate_crit is either increased or reset to zero to allow for the maximum data rate.

In the following, the flow diagram of FIG. 2 is described in more detail. After a start, indicated with box 201, the parameters are initialized, as shown in box 202, as follows:
  rate=max, i.e. the data rate is set to maximum;
  pow=max, i.e. the transmit power level is set to maximum;
  rate_crit=0, the critical value rate_crit is set to zero, i.e. there is no value set;
  s=0; f=0, the success counter 10 and failure counter 11 are set to zero; and
  pcnt=0, the delay value counter 13 is set to zero.

As indicated with WAIT in symbol 203, the transmitter 1 is in a waiting mode in order to check whether or not a successful transmission was performed. Therefore, the "ACK" (acknowledgment) signal is read as indicated with box 204. In case the transmission was successful, which is decided according to box 205, the success counter 10 is incremented (s++) and the failure counter 11 is reset to zero (f=0), as indicated with box 206. It is further verified whether the value of successful transmissions s has reached the success threshold value $S_{max}$, which is indicated with box 207. If not, the mechanism goes back to box 204, but if yes, the success counter 10 is reset to zero (s=0) and the failure counter 11 is reset to zero (f=0), as indicated with box 208. Then, the current data rate is compared with the maximal data rate, as indicated with decision box 209, and in the event of parity the transmit power level is reduced, as shown with pow-- in box 210, and the mechanism follows in the waiting mode 203. When the current data rate is lower then the maximal data rate, then the critical value rate_crit is verified, i.e. whether the value is set, as indicated with decision box 211. If the critical value rate_crit is not set (rate_crit=0), the data rate is increased, as shown with rate++ in box 212. However, when the critical value rate_crit is set, then the value pcnt of the delay value counter 13 is compared with the threshold $P_{max}$. In case of no parity, the power level is decreased while the delay value counter 13 is increased, as shown with pow--, pcnt++ in box 215. In case of parity, the following according to box 214 is performed:
  pow_max, the transmit power level is set to maximum;
  rate=rate_crit, the data rate is set to the critical value rate_crit; and
  pcnt=0, the value pcnt of the delay value counter 13 is reset to zero. Moreover, according to a "conservative approach" the critical value rate_crit can be increased (rate_crit++) or in a more "optimistic approach" the critical value rate_crit might be reset to zero (rate_crit=0), which means that then no critical value rate_crit is set and there is not limit for the next round.

In case the transmission was not successful, which is decided according to the decision box 205, the failure counter 11 is incremented (f++) and the success counter 10 is reset to zero (s=0), as indicated with box 216. It is further verified whether the value of faulty transmissions f has reached the threshold value $F_{max}$ of faulty transmissions, which is indicated with box 217. If not, the mechanism goes back to box 204, but if yes, the failure counter 11 is reset to zero (f=0), the success counter 10 is reset to zero (s=0), and the value pcnt of the delay value counter 13 is decremented down to zero, as indicated with max(pcnt--, 0) in box 218. Then, the current transmit power level is compared with the maximal power level, as indicated with decision box 219, and in the event of parity the critical value rate_crit is set to the current data rate and the current data rate is then decreased, as shown by rate_crit=rate, rate-- in box 220. The mechanism follows in the waiting mode 203 again. When the current transmit power level is lower then the maximal power level, then the transmit power level is increased, as shown with pow++ in box 221.

Figure 3:
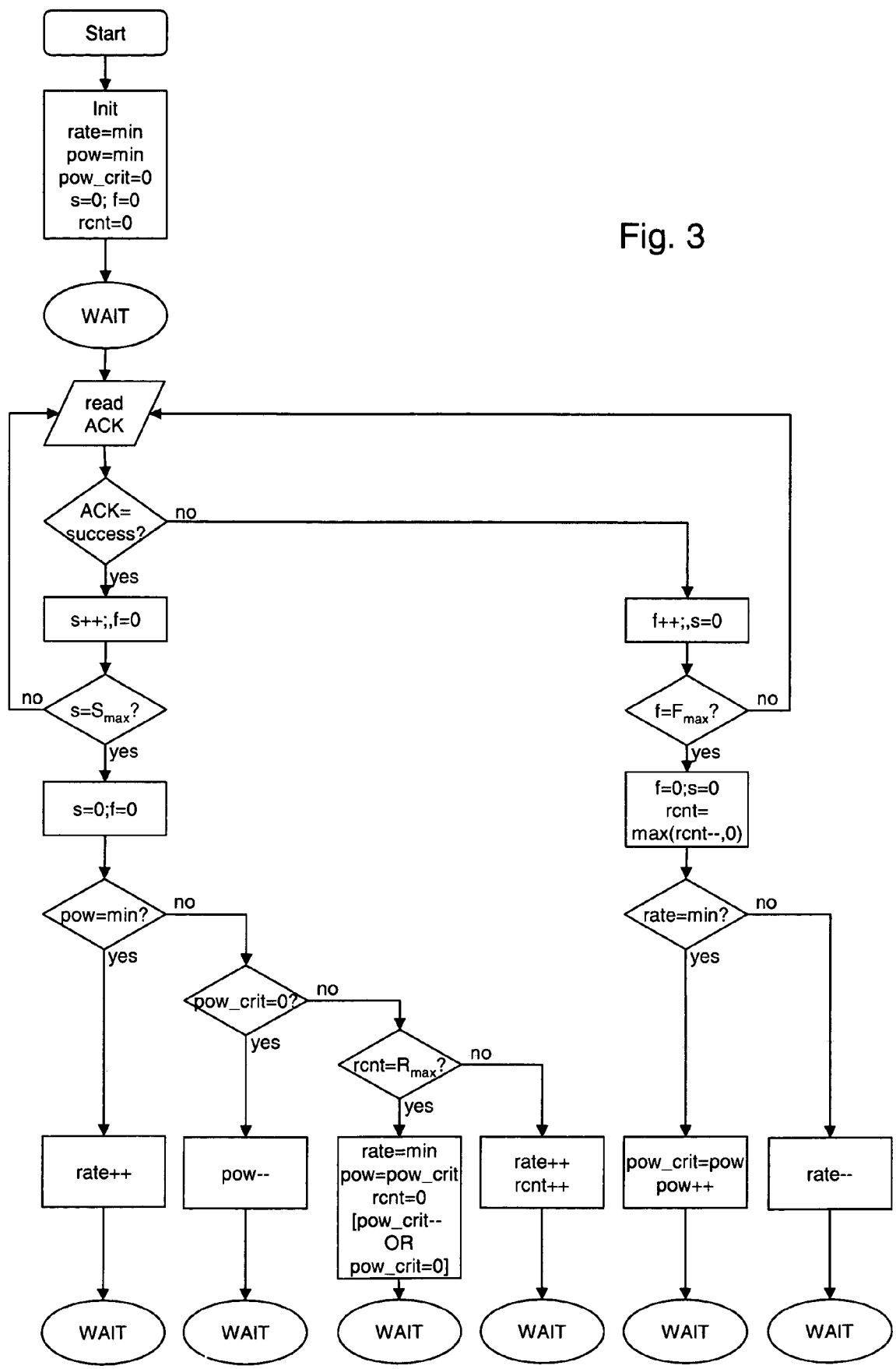
FIG. 3 shows a schematic illustration of a flow diagram according to a second embodiment as it is applicable by the transmitting station for a power saving mode.

FIG. 3 shows a self-explaining schematic illustration of a flow diagram according to a second embodiment as it is applicable by the transmitting station 1 for the power saving mode. In the power saving mode it is tried to use the lowest possible transmit power level, and to only optimize the transmit rate when the power level cannot be further decreased. The flow diagram corresponds to the flow in FIG. 2 and is the dual operation of the "throughput performance" mode with the following dualities: rate replaced by power, increase operation replaced by decrease, min replaced by max, rate=min, and pow=min. Instead of locking the critical value for the data rate rate_crit the value for power pow_crit is locked, pcnt is replaced by the rate counter rcnt, the counter limit is $R_{max}$. Hence the critical operations are described as follows: If a certain power does not result in a successful transmission even for the lowest possible data rate, the unsuccessful power level is stored as critical value pow_crit in the critical mode register 12, the power level is increased. If the power level is equal to the critical value pow_crit it can be tried to adjust the data rate with a higher power level for an optimal data rate and power level R, P pair. If the power level above the critical value pow_crit still results in successful transmissions after increasing the data rate $R_{max}$ times, it is assumed that the channel conditions have improved again. Hence, it can be tried to decrease the power level back to the critical value pow_crit using the lowest possible transmit data rate. In order to further decrease the minimum power level, the critical value pow_crit is either decreased or reset to zero to allow for the minimum power level.

Figure 4:
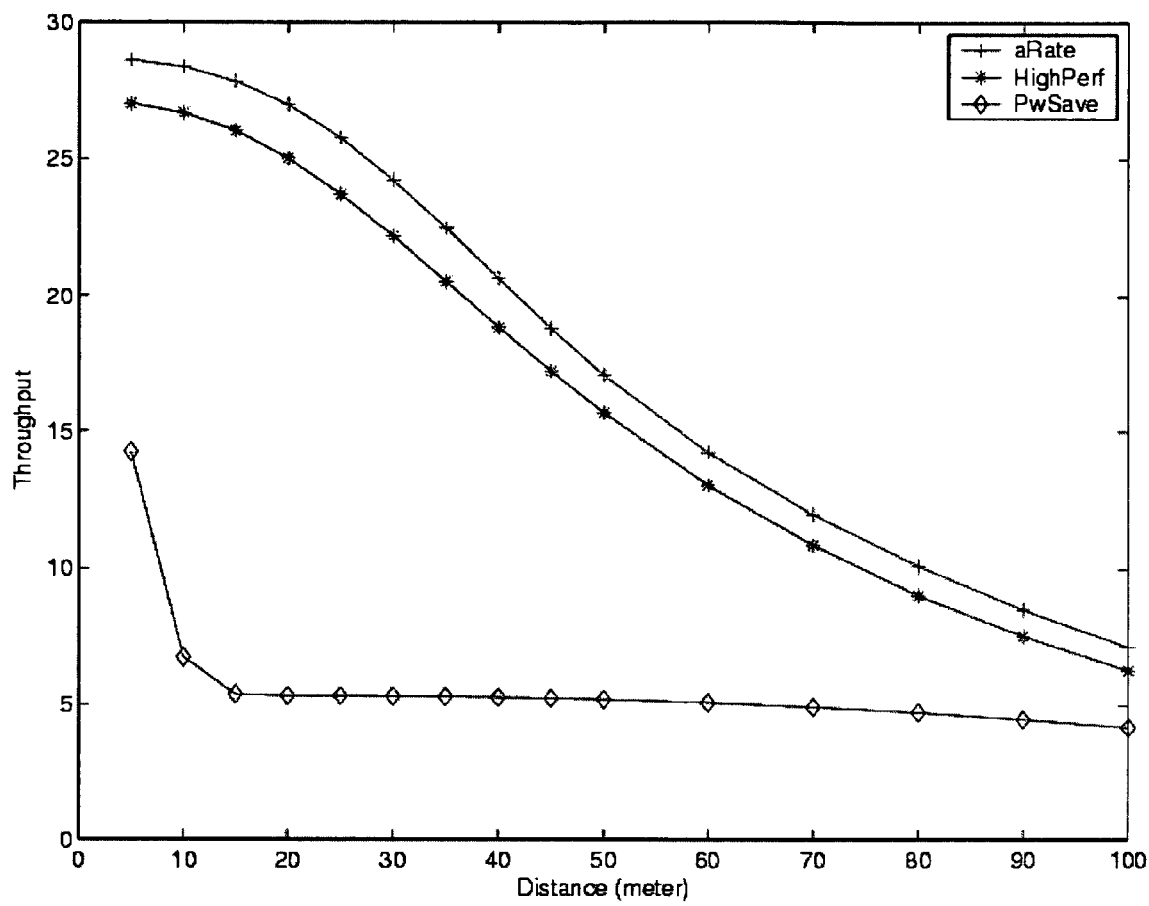
FIG. 4 shows a diagram that illustrates a throughput over distance for various modi.
Figure 5:
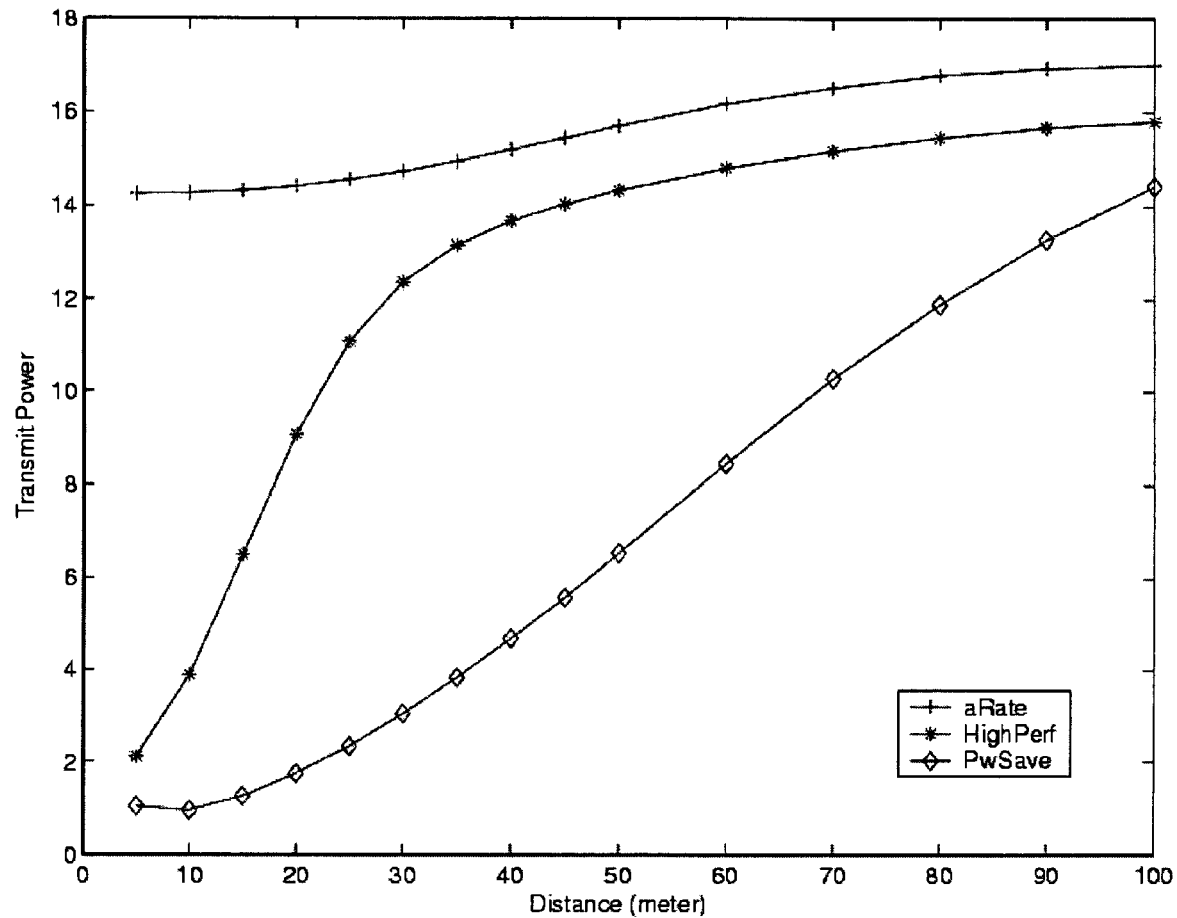
FIG. 5 shows a diagram that illustrates an average transmission power over distance for the various modes.

FIG. 4 shows a diagram that illustrates a throughput over distance for various modes, where "aRate" illustrates a full power mode, where only the rate is adapted; "HighPerf" corresponds to the throughput performance mode; and "PwSave" corresponds to the power saving mode. FIG. 5 shows a diagram that illustrates an average transmission power over distance for the various modes. The throughput performance mode (HighPerf) is designed to maximize the possible throughput and at the same time to minimize the transmit power. Compared with the full power mode, where only the rate is adapted (aRate) according to the channel conditions (e.g. distance between transmitter and receiver) the throughput is slightly degraded. However, the transmit power at almost maximum throughput can be reduced considerably in comparison with the "aRate" mode, as shown in FIG. 5. In the power saving mode (PwSave) the rate and therefore the throughput is kept at a minimum value unless the channel conditions are so good (very short distance between transmitter and receiver) that at the lowest possible power level the data can successfully transmitted at a higher data rate resulting in an improved throughput. The required transmit power of the "PwSave" mode is very low compared with the other modes as depicted in FIG. 5.

Figure 6:
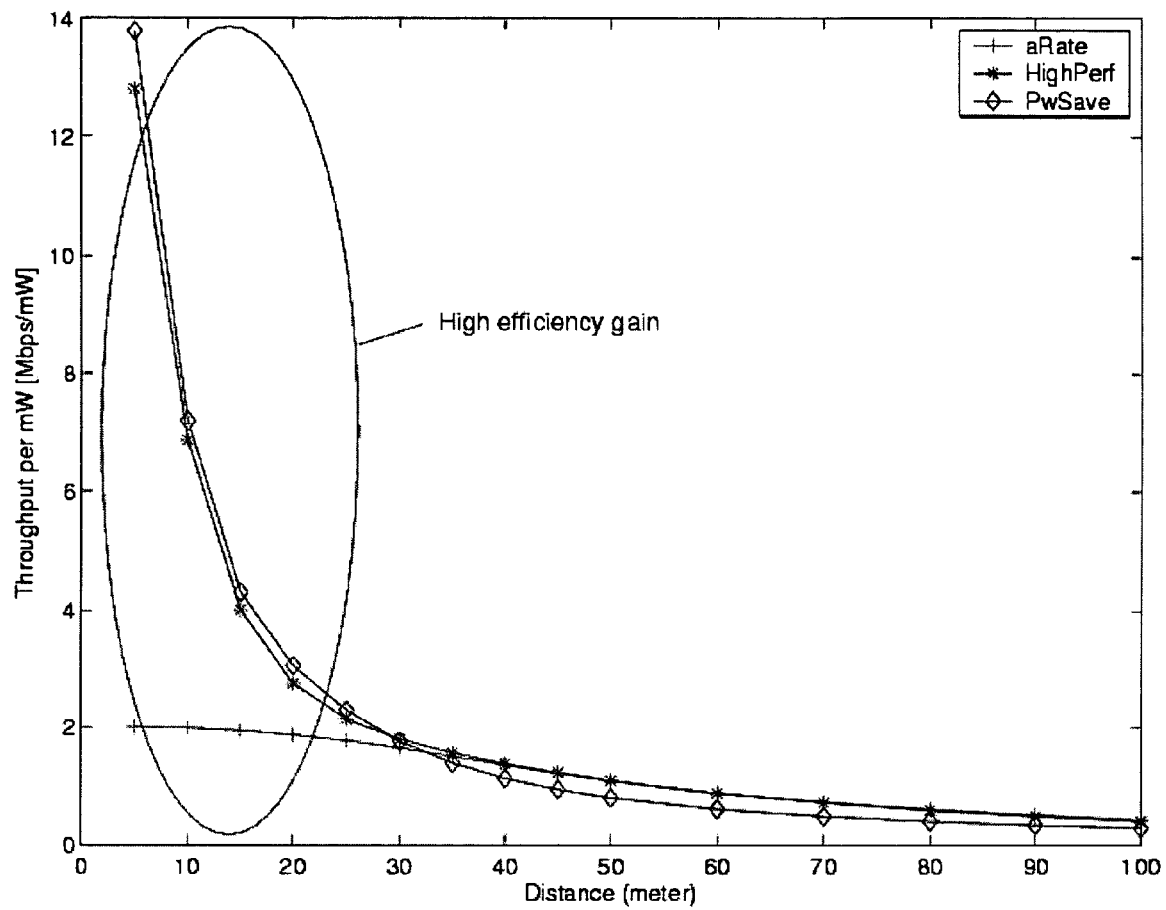
FIG. 6 shows a diagram that illustrates a throughput efficiency over distance for the various modes.

FIG. 6 shows a diagram that illustrates a throughput efficiency over distance for the various modes. Throughput efficiency as shown in FIG. 6 is defined as throughput in Mbps divided by the transmit power in mW. Compared with the pure rate adaptation mode transmitting at the highest power level the efficiency of both the throughput performance (HighPerf) mode and the power saving (PwSave) mode can be improved considerably for short to medium distances which represent a very common usage scenario. For large distances the modi "HighPerf" and "aRate" perform most efficiently. Overall, FIG. 6 suggests to transmit at the highest possible rate with the required transmit power to optimize the throughput efficiency, when the transmit power constraints support this mode.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for adapting first and second transmission parameters in a transmitting node of a data communication system to the current link quality of a data communication channel, the method comprising in the transmitting node the steps of:
    counting the number of successful transmissions, each successful transmission bases on a receipt of an acknowledgement;
    comparing the number of successful transmission against a threshold value; and
    in the event of achieving the number of successful transmissions with the threshold value and operating with the first and second transmission parameters in a predetermined parameter space,
    jointly adapting both of the first and second transmission parameters in dependence on a critical value that due to the current link quality corresponds to a temporarily unsupported rate and power value of one of the first and second transmission parameters, wherein said jointly adapting includes one of: supporting a highest possible data rate by increasing a data rate transmission until a maximum rate is found, and if said rate cannot be increased further, reducing said transmit power level; or, supporting a lowest possible transmit power level by decreasing a power transmission level until a power level can not be further reduced and to increase the transmit rate when the transmit power level can not be further decreased.

2. A method according to claim 1, wherein the step of adapting further comprises adapting the at least one of the first and second transmission parameters in dependence on a delay value.

3. A method according to claim 2, wherein in the event of equating the delay value to a maximum transmission value, the critical value is adjusted.

4. A method according to claim 2, wherein in the event of equating the delay value to a maximum success transmission value, the critical value is set to nil.

5. A method according to claim 1, further comprising operating in one of a throughput performance mode and a power saving mode.

6. A method according to claim 5, wherein each of the first and second transmission parameters is associated with a data rate and a power level in dependence of the mode.

7. A program storage device readable by computer, tangibly embodying a program of instructions executable by the computer to perform method steps for adapting first and second transmission parameters in a transmitting node of data communication system to the current link quality of a data communication channel, said method steps comprising the steps of claim 5.

8. A computer program product comprising a computer usable medium having computer readable program code means embodied therein for execution by a processor to perform method steps for adapting first and second transmission parameters in a transmitting node of a data communication system to a current link quality of a data communication channel, according to method steps of claim 1.

9. A program storage device readable by computer, tangibly embodying a program of instructions executable by the computer to perform method steps for adapting a first and second transmission parameters in a transmitting node of a data communication system to the current link quality of a data communication channel, said method steps comprising the steps of claim 1.

10. A program storage device readable by the computer, tangibly embodying a program of instructions executable by the computer to perform method steps for adapting a first and second transmission parameters in a transmitting node of a data communication system to the current link quality of a data communication channel, said method steps comprising the steps of claim 2.

11. A program storage device readable by computer, tangibly embodying a program of instructions executable by the computer to perform method steps for adapting a first and second transmission parameters in a transmitting node of a data communication system to the current link quality of a data communication channel, said method steps comprising the steps of claim 3.

12. A program storage device readable by computer, tangibly embodying a program of instructions executable by the computer to perform method steps for adapting a first and second transmission parameters in a transmitting node of a data communication system to the current link quality of a data communication channel, said method steps comprising the steps of claim 4.

13. An apparatus for adapting a first and second transmission parameters in a transmitting node of a data communication system to the current link quality of a data communication channel, the apparatus comprising:
  a success counter for counting the number of successful transmissions, each successful transmission bases on a receipt of an acknowledgment;
  a comparison unit for comparing the number of successful transmissions against a threshold value;
  a critical mode register for storing a critical value that due to the current link quality corresponds to a temporarily unsupported rate and power value of one of the first and second transmission parameters; and
  a decision unit for jointly adapting both of the first and second transmission parameters in dependence on the critical value stored in the critical mode register, wherein said jointly adapting includes one of: supporting a highest possible data rate by increasing a data rate transmission until a maximum rate is found, and if said rate cannot be increased further, reducing said transmit power level; or, supporting a lowest possible transmit power level by decreasing a power transmission level until a power level can not be further reduced and to increase the transmit rate when the transmit power level can not be further decreased.

14. An apparatus according to claim 13, further comprising a delay value counter for counting a number of faulty transmissions.

15. An apparatus according to claim 13, further comprising a delay value counter for counting a delay value.

16. A computer program product comprising a computer usable medium having computer readable program code means embodied therein for causing adaptation of a first and second transmission parameters in a transmitting node of a data communication system to the current link quality of a data communication channel, the computer readable program code means in said computer program product comprising computer readable program code means for causing a computer to effect the functions of claim 15.

17. An article of manufacture comprising a computer usable medium having computer readable program code means embodied therein for causing adaptation of first and second transmission parameters in a transmitting node of a data communication system to the current link quality of a data communication channel, the computer readable program code means in said article of manufacture comprising computer readable program code means for causing a computer to effect in the transmitting node the steps of:
  counting the number of successful transmissions, each successful transmission bases on a receipt of an acknowledgment;
  comparing the number of successful transmissions against a threshold value; and
  in the event of achieving the number of successful transmissions with the threshold value and operating with the first and second transmission parameter in a predetermined parameter space,
  jointly adapting both of the first and second transmission parameters in dependence on a critical value that due to the current link quality corresponds to a temporarily unsupported rate and power value of one of the first and second transmission parameters, wherein said jointly adapting includes one of supporting a highest possible data rate by increasing a data rate transmission until a maximum rate is found, and if said rate cannot be increased further, reducing said transmit power level; or, supporting a lowest possible transmit power level by decreasing a power transmission level until a power level can not be further reduced and to increase the transmit rate when the transmit power level can not be further decreased.

* * * * *